United States Patent [19]

Murai et al.

[11] Patent Number: 5,100,999
[45] Date of Patent: Mar. 31, 1992

[54] POLYCARBONATEDIOL COMPOSITION AND POLYURETHANE RESIN

[75] Inventors: Takaaki Murai; Tatsumi Fujii, both of Hiroshima, Japan

[73] Assignee: Daicel Chemical Industries, Ltd., Osaka, Japan

[21] Appl. No.: 403,434

[22] Filed: Sep. 6, 1989

[30] Foreign Application Priority Data

Sep. 6, 1988 [JP] Japan ............... 63-223893
Dec. 19, 1988 [JP] Japan ............... 63-319826
May 2, 1989 [JP] Japan ............... 1-113236
May 8, 1989 [JP] Japan ............... 1-114686

[51] Int. Cl.$^5$ ............... C08F 283/02; C08G 18/32
[52] U.S. Cl. ............... 528/76; 528/80; 521/159
[58] Field of Search ............... 528/76, 80; 521/159

[56] References Cited

U.S. PATENT DOCUMENTS 4,808,691 2/1989 König et al. ............... 528/76
4,816,529 3/1989 Harris ............... 528/76

Primary Examiner—John Kight, III
Assistant Examiner—Duc Truong
Attorney, Agent, or Firm—Suhrue, Mion, Zinn, Macpeak & Seas

[57] ABSTRACT

A polycarbonatediol composition is disclosed having carbonate bonds and from about 1 to 40 ether bonds to one carbonate bond in a molecule, which can provide polyurethanes having high mechanical strength and heat and moisture resistibility, and furthermore having improved properties at low temperatures.

Further disclosed is a polyurethane resin prepared by reaction of an organic diisocyanate compound with the polycarbonatediol composition. The polyurethane resin has excellent properties under low temperature conditions, while retaining high levels of mechanical strength, excellent resistibility under high heat and moisture conditions, etc., thereby maintaining a good balance of properties. The polyurethane resin in accordance with the present invention is useful in a very wide variety of forms, including spandex, rigid or flexible urethane foams, thermoplastic urethane elastomers and thermosetting urethane elastomers, adhesives, synthetic leather, paints, etc.

7 Claims, No Drawings

POLYCARBONATEDIOL COMPOSITION AND POLYURETHANE RESIN

FIELD OF THE INVENTION

The present invention relates to a novel polycarbonatediol composition having both carbonate bonds and from about 1 to 40 ether bonds to one carbonate bond in a molecule, which are formed by using a polyether polyol as a component of diols, and having the property of being easily liquified.

Furthermore, the present invention relates to a polyurethane resin prepared by reaction of an organic diisocyanate compound with the polycarbonatediol composition, the polyurethane resin has excellent properties under low temperatures conditions.

BACKGROUND OF THE INVENTION

Hitherto, polyurethane resins have been used in a wide variety of forms including foams, adhesives, fibers, elastomers, and paints.

They are prepared mainly by a reaction of an organic diisocyanate compound with polyol compounds.

The polyol compounds which have been employed include polyether polyols such as polypropylene glycols, polytetramethylene glycols, polyester polyols which are derived from divalent carboxylic acids such as adipic acid, and polyhydric alcohols, and polylactone polyols which are obtained by a reaction of lactones with alcohols.

A variety of polyol compounds have been used to produce polyurethane resin which is used for many kinds of purposes.

However, as polyether polyols have many ether bonds, the urethane resin which is produced by employing them has the disadvantage of being poor in heat resistibility and in weatherability.

The urethane resin which is produced by employing polyester of polylactone polyols has the disadvantage of being poor in water resistibility, thought to be due to presence of ester bonds.

The use of polyols having carbonate bonds in their molecular structure has been proposed to produce novel urethane resins which overcome the foregoing disadvantages.

The polycarbonatepolyol which is used more widely than any other type of polyol compound is the polyol having a carbonate bond in the molecular structure containing 1,6-hexanediol in the main chain of the molecular structure, as shown by formula (I):

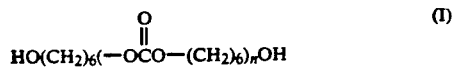

(I)

The polycarbonatediol having 1,6-hexanediol structures in the main chain can produce a polyurethane resin having a very good balance of various properties, including mechanical strength, excellent resistibility under high heat and moisture conditions, etc., thereby maintaining a good balance of properties, and has also the advantage of being easy to produce on an industrial basis.

The polycarbonatediols having 1,6-hexanediol structures in the main chain, however, has a melting temperature range of 40° to 50° C.; therefore, it is a relatively hard wax-like solid at ordinary temperatures. A polyurethane resin prepared by reaction of an organic diisocyanate compound with the polycarbonatediol composition, therefore, has a disadvantage of large value of modulus at low temperature conditions.

Accordingly, it is required to be melted before use as a raw material for manufacturing urethane resins, etc., using a tank for heating and melting.

Furthermore, the use of the tank for heating and melting is inevitably required to prevent heat radiation from the surface of the tank and piping. Accordingly, it is disadvantageous not only from the viewpoint of energy costs, but also plant costs. On the other hand, a polyurethane resin, which has an excellent property at low temperature conditions, prepared by reaction of an organic diisocyanate compound with a polyether polyol composition has a disadvantage of being poor in heat resistibility.

For the purpose of overcoming the above disadvantages, a random copolymer composed of ε-caprolactone and dialkylcarbonate such as diethylcarbonate or dimethylcarbonate had been disclosed in Japanese Publication Laid-open No. 115925/1985 (entitled: A Process for Producing Polyurethane).

The random copolymer is liquid polyol having a low melting temperature.

However a polyurethane prepared with said randomly copolymerized polyol has a disadvantage of being poor in heat and moisture resistibility. Such is thought to be due to ester bonds based on ε-caprolactone in the molecules. The inventors of this invention have now found that it is possible to solve the problems as hereinabove pointed out and produce polyurethanes having high mechanical strength and heat and moisture resistibility, and furthermore having improved properties at low temperatures, by employing a particular polycarbonatediol composition which has both carbonate bonds and suitable amounts of ether bonds in a molecule.

SUMMARY OF THE INVENTION

The present invention has been found as a result of intensive studies in order to develop novel polycarbonatediol compositions and polyurethane resins.

Therefore in accordance with the present invention there is provided a polycarbonatediol composition obtained by reaction of a compound selected from the group consisting of compounds which require dehydrochlorination, alkylene carbonates, diaryl carbonates and dilkyl carbonates, with an aliphatic diol which comprises a mixture of (1) from 20 to 80 mol % of a polyether poloyol having molecular weight of from 300 to 2,000, and (2) from 80 to 20 mol % of at least one polyvalent alcohol in which the number of carbon atoms in the polymer chain is not more than 20.

The polycarbonatediol composition of this invention can provide a polyurethane resin having various excellent properties.

Also, the polyurethane resins of this invention are prepared by a reaction of an organic diisocyanate compound with the polycarbonatediol composition.

The polyurethane resin of the invention has excellent properties under low temperature conditions, while retaining high levels of mechanical strength, more excellent resistibility under high heat and moisture conditions, etc., thereby maintaining a good balance of properties.

The polyurethane resin which is produced in accordance with the present invention is more useful in a very wide variety of forms including spandex, rigid or flexible urethane foams, thermoplastic urethane elastomers and thermosetting urethane elastomers, adhesives, synthetic leather, paints, etc.

DETAILED DESCRIPTION OF THE INVENTION

The present invention is described below in more detail.

In the polycarbonatediol composition, examples of compounds which require dehydrochlorination include phosgene, bischloroformate, etc.

Alkylene carbonates include ethylene carbonate, 1,2-propylene carbonate, 1,2-butylene carbonate, etc.

Diaryl carbonates include diphenyl carbonate, dinaphtyl carbonate, etc.

Dialkyl carbonates include dimethyl carbonate, diethyl carbonate, etc.

Any of these compounds can be allowed to react with an aliphatic diol which comprises a mixture of (1) from 20 to 80 mol % of a polyether polyol having molecular weight of from 300 to 2,000, and (2) from 80 to 20 mol % of at least one polyvalent alcohol in which the number of carbon atoms in the polymer chain is not more than 20, which is further described below to form a polycarbonatediol composition.

Polyether polyols which can be employed for the purpose of this invention include a polyvalent alcohol such as polyethylene glycol, polypropylene glycol, polybutylene glycol, etc., and also a polyether polyol obtained by copolymerization of ethylene oxide and propylene oxide.

Furthermore, polytetramethylene glycol (PTMG) can be used, which is a polymer obtained by ring-opening polymerization of tetrahydrofran.

The molecular weight of the above-described polyether polyol is from 300 to 2,000.

If the molecular weight of the polyether polyol is less than 300, the features of polycarbonatediol composition obtained by use of the polyether polyol are lost and no polyurethane having a good balance of properties can be produced.

On the other hand, if the molecular weight of the polyether polyol is more than 2,000, the resulting polycarbonatediol composition is undesirably high, for example, having a molecular weight at least from 4,000 to 5,000.

Polycarbonatediol composition having the molecular weight of from 4,000 to 5,000 is not suitable as a raw material for preparing polyurethane. Polyvalent alcohols having the number of carbon atoms not more than 20 which can be employed for the purpose of this invention include ethylene glycol, 1,2-propanediol, 1,3-butanediol, 2-methyl-1,3-propanediol, 1,4-butanediol, neopentyl glycol, 2-methylpentanediol, 3-methylpentanediol, 2,2,4-trimethyl-1,6-hexanediol, 3,3,5-trimethyl-1,6-hexanediol, 2,3,5-trimethyl-1,6-pentanediol, etc.

It is possible to use either one kind of polyether polyol or a mixture composed of two or more kinds thereof.

A mixture composed of from 20 to 80 mol % of polyether polyol and from 80 to 20 mol % of at least one polyvalent alcohol having the number of carbon atoms not more than 20 is allowed to react with a dialkyl carbonate, etc., to produce a polycarbonatediol composition.

If the mixture contains less than 20 mol % of a polyether polyol having a molecular weight of from 300 to 2,000, the resulting polycarbonatediol composition is inferior in various kinds of properties under the low temperature conditions.

It is not the quality which is aimed by this invention.

On the other hand, if the mixture contains more than 80 mol % of a polyether polyol having molecular weight of from 300 to 2,000, the features of polyvalent alcohol are lost, and no polyurethane that is satisfactory in mechanical strength, etc., can be produced.

In the event that a dialkyl carbonate is used for the purpose of this invention, it is preferable to use dimethyl or diethyl carbonate.

In the case that a dialkyl carbonate compound is used as a carbonate compound, the reaction for the preparation of the polycarbonatediol composition of the present invention is represented by the formula:

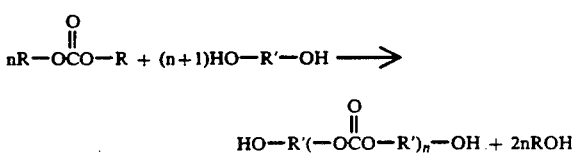

wherein R is an alkyl group, and R' is an alkylene group.

In the case that phosgene or a bischloroformate is used to prepare the polycarbonatediol composition, the scheme of the reaction can be represented as follows:

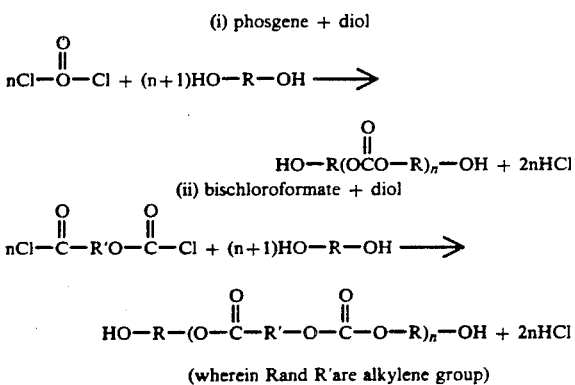

(wherein R and R' are alkylene group)

Both reactions (i) and (ii) can be described as dehydrochlorination reactions.

The two kinds of diol compounds which are used as the starting materials are incorporated into the molecule randomly by a carbonate bond.

If one of them is shown as HO—R$^1$—OH, and the other as HO—R$^2$—OH,

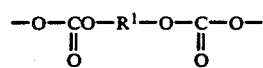

and

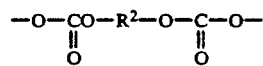

are present randomly in the molecule.

The random combination in the polycarbonatediol composition results in disordered crystallinity, to thus obtain a polycarbonatediol composition having excellent properties under below room temperature conditions. The crystallinity depends on 1,6-hexanediol structures.

Detailed description is set forth below of the reaction process, etc., which are applicable when, for example, a dialkyl carbonate is employed as the material to be reacted with the aliphatic diol comprising a mixture of (1) from 20 to 80 mol % of a polyether polyol having molecular weight of from 300 to 2,000, and (2) from 80 to 20 mol % of at least one polyvalent alcohol in which the number of carbon atoms in the polymer chain is not more than 20.

It is possible to employ for the reaction any catalyst that is conventionally employed for an ester interchange reaction.

More specifically, it is possible to use, for example, a metal such as lithium, sodium, potassium, rubidium, cesium, magnesium, calcium, strontium, barium, zinc, aluminum, titanium, cobalt, germanium, tin, lead, antimony, arsenic, or cesium, or an alkoxide thereof.

Other examples of preferred catalyst include alkali and alkaline earth metal carbonates, zinc borate, zinc oxide, lead silicate, lead carbonate, antimony trioxide, germanium dioxide, cerium trioxide, and aluminum isopropoxide.

Particularly useful catalysts are organic metal compounds such as the magnesium, calcium, cerium, barium, zinc, tin, titanium, or other metal salts of organic acids.

It is generally appropriate to use the catalysts in the amount which is equal to 0.0001 to 1.0%, and preferably 0.001 to 0.2%, of the total weight of the starting materials.

It is preferable to employ a reaction temperature of about from 80° C. to 220° C.

A temperature in the neighborhood of the boiling point of dialkyl carbonate is employed during the initial stage of the reaction, and as the reaction proceeds, the temperature is gradually raised.

A reaction vessel having a distillation column is usually employed to enable the separation of the diol compound which is produced from the dialkyl carbonate employed as the starting material.

The reaction is caused to take place while the dialkyl carbonate is refluxed, and the alcohol which is produced with the progress of the reaction is removed by distillation.

In the event that a part of the dialkyl carbonate is lost by azeotropy with the alcohol which is removed by distillation, it is advisable to take the amount of any such possible loss of dialkyl carbonate into consideration when weighing the starting materials to be charged into the reaction system.

Although it is obvious from the reaction formula which has hereinabove been given that n mols of dialkyl carbonate and (n+1) mols of diol compound define their theoretical molar ratio, it is in practice preferable to employ a molar ratio of dialkyl carbonate to diol compound which is from 1.1 to 1.3 times greater than their theoretical molar ratio.

Although the reaction may be performed at normal pressure, its progress can be promoted if a reduced pressure in the range of, say, 1 to 200 mmHg is employed during its later stage.

The molecular weight of the polycarbonate diol composition which is employed for the purpose of this invention can be adjusted if the molar ratio of the diol compound and the other materials, such as dialkyl or dialkylene carbonate, to be reacted is altered.

In other words, the molecular weight can be adjusted as diol composition can be hydrated to confirm the structural components by an analysis of hydrated products with gas chromatography or NMR.

On the other hand, the invented polyurethane resin, can be prepared by a reaction of an organic isocyanate compound with the above described polycarbonatediol composition.

Examples of the organic diisocyanate compounds which can be employed include 2,4-tolylene diisocyanate, 2,6-tolylene diisocyanate, 4,4'-diphenylmethane diisocyanate, tolidine diisocyanate, xylene diisocyanate, hydrogenated 4,4'-diphenylmethane diisocyanate, hexamethylene diisocyanate, isophorone diisocyanate, 4,4'-dicyclohexylmethane diisocyanate, 1,5-naphthalene diisocyanate, carbodiimidemodified methylene diisocyanate and xylylene diisocyanate.

One or more compounds are employed.

A chain extender may also be present in the mixture, if desired.

A low-molecular weight compound having active hydrogen can be used as the chain extender.

Specific examples thereof are ethylene glycol, propylene glycol, 1,4-butylene glycol, 2-methylpropanediol, neopentyl glycol, pentane-diol, 1,6-hexanediol, ethylenediamine, propylenediamine, hydrazine, isophoronediamine, metaphenylenediamine, 4,4'-diaminodiphenylmethane, diaminodiphenylsulfone, and 3,3'-dichloro-4,4'-diaminodiphenylmethane. The manufacture of polyurethanes by this invention can be accomplished either by the prepolymer process in which a polyol and an excess of an organic diisocyanate compound are allowed to react to form a prepolymer having isocyanate group in terminal positions and the prepolymer is allowed to react with a diol, diamine, etc., as a chain extender, or by a one-shot process in which all of the constituents required for making a polyurethane are added simultaneously.

A solvent may or may not be used for performing any such reaction.

If any solvent is used, it is preferable to use an inert one.

Specific examples of the solvents which can be used are toluene, ethyl acetate, butyl acetate, methyl ethyl ketone, dimethylformamide, and tetrahydrofuran.

A catalyst can be employed for promoting the reaction for urethane formation.

It is possible to use as the catalyst, for example, an organic tin compound such as tin octylate or dibutyl-tin dilaurate, or a tertiary amine such as N-methylmorpholine or triethyl amine.

The carbonatediol composition and polyurethane resin of the present invention can be hydrolyzed to analyze partial molecular structure, which composes a mixture of from 20 to 80 mol % of a polyether polyol having molecular weight of from 300 to 2,000, and (2) from 80 to 20 mol % of at least one polyvalent alcohol in which the number of carbon atoms in the polymer chain is not more than 20, of the hydrolyzed products by analysis with gas chromatography or an NMR analyzer.

The present invention is further illustrated below by examples.

Synthesis Example 1

A round bottom flask having a capacity of two liters and equipped with a stirrer, a thermometer, and a distillation column having 10 perforated plates was charged with 620 g (6.89 mols) of dimethylcarbonate, 740 g (6.27 mols) of 1,6-hexanediol, 640 g (0.77 mols) of polytetramethylene glycol having molecular weight of 830 (PTMG 800 produced by Mitsubishi Chemical Co., Ltd.) and 0.30 g of tetrabutyl titanate as a catalyst.

The reaction was performed at normal pressure with the dimethylcarbonate being boiled, and the resulting methanol was removed by distillation.

The temperature of the reaction vessel was gradually raised to 200° C. and when the formation of methanol stopped substantially completely, evacuation of the vessel was started and continued until a reduced pressure of 20 mmHg was ultimately reached, whereby the raw materials were removed by distillation and a reaction product was obtained.

The obtained polycarbonatediol composition was a paste having a hydroxyl number of 55.2 and a melting point of about 30° C.

Synthesis Example 2

Synthesis Example 1 was repeated, except that the 640 g (0.77 mols) of polytetramethylene glycol was replaced with 640 g (0.853 mols) of polypropylene glycol having molecular weight of 750 (Sunnix PP 750 produced by San-you Chemical Co., Ltd.).

The obtained polycarbonatediol composition was a viscous liquid having a hydroxyl number of 57.1.

Synthesis Example 3

Synthesis Example 1 was repeated, except that the 1,6-hexanediol was replaced with 740 g (6.27 mols) of 3-methyl-1,5-pentanediol. The obtained polycarbonatediol composition was a viscous liquid having a hydroxyl number of 55.2.

Synthesis Example 4

Synthesis Example 1 was repeated, except that the 1,6-hexanediol was replaced with 990 g (11 mols) of 1,4-butanediol.

The obtained polycarbonatediol composition was a paste having a hydroxyl number of 56.5 and a melting point of 30° C.

Synthesis Example 5

Synthesis Example 1 was repeated, except that the 1,6-hexanediol was replaced with a mixture composed of 3-methylpentanediol-1,6-hexanediol=2/1 based on molar ratio.

The obtained polycarbonatediol composition was a viscous liquid having a hydroxyl number of 55.8.

Synthesis Example 6

Synthesis Example 1 was repeated, except that the 640 g (0.77 mols) of polytetramethylene glycol having molecular weight of 830 was replaced with 640 g (0.98 mols) of polytetramethylene glycol having molecular weight of 650 (PTMG 650 produced by Mitsubishi Chemical Co., Ltd.).

The obtained polycarbonatediol composition was a viscous liquid having a hydroxyl number of 57.2.

Comparative Synthesis Example

Synthesis Example 1 was repeated, except that only 1,6-hexanediol was used as a diol compound.

Examples 1 to 6 and Comparative Example

Polyurethane resins were synthesized from the polycarbonatediol compositions prepared in Synthesis Examples from 1 to 6 and in Comparative Synthesis Example, respectively, under the reaction conditions hereinafter stated. Parts are by weight.

A polyurethane film having a thickness of 150 microns was formed from each polyurethane resin and examined for physical properties.

Reaction Conditions for the Synthesis of Polyurethane resins (1) Component

| Polyol | 100 parts |
|---|---|
| 1,4-BG | 8.3 parts |
| MDI | 35.6 parts |
| Solvent (DMF) | 267.3 parts |

(Note)
Polyol (Mw 2000/1,4-BG/MDI
NCO/OH = 1.03
1,4-BG/polyol = 2.0
1,4-BG: 1,4-butanediol
MDI: methylene diisocyanate
DMF: dimethyl formamide (2) Reaction Steps A reaction vessel was charged with 100 parts of polyol, 8.3 parts of 1,4-BG and 144 parts of solvent and heated to a temperature of 60° C.

Then, the vessel was charged with 35.6 parts of MDI and further heated.

After the temperature of the vessel was raised to 80° C., that temperature was maintained for several hours.

Then, the temperature was dropped to 60° C.

When the temperature had dropped to 60° C., the vessel was additionally charged with 123.3 parts of solvent, and aging was allowed to take place at that temperature.

(3) Properties of Polyurethane resins

| NV (%) | = 35 |
|---|---|
| Viscosity (cp at 25° C.) | = 60,000 to 80,000 |
| Solvent | = DMF |

(4) Formation of Film

A polyurethane resin solution was coated onto a sheet of release paper and dried to form a film having a thickness of 150 microns.

(5) Examination of Physical Properties

JIS K6301 (Physical Testing Methods for Vulcanized Rubber) #3 dumbbell specimens were formed from each film and were examined for physical properties using a Shimadzu autograph (model PCS-5000).

The results obtained in Examples from 1 to 6 and in the Comparative Example are shown in Table 1.

Table 1 indicates that polyurethane resins synthesized according to the polycarbonatediol compositions of the present invention are quite excellent in modulus under low temperature conditions compared to that of the Comparative Example.

The results obtained in Synthesis Example 1 to 6 and Comparative Synthesis Example are shown in Table 1.

Table 1 indicates that polyurethane resin according to the present invention has an excellent property under low temperature conditions.

TABLE 1

|  | Ex. 1 | Ex. 2 | Ex. 3 | Ex. 4 | Ex. 5 | Ex. 6 | Comparative Example |
|---|---|---|---|---|---|---|---|
|  | \multicolumn{6}{c}{Used PCD} | Used PCD |
|  | (1) | (2) | (3) | (4) | (5) | (6) | (e) |
| 100% M (kgf/cm$^2$) | 49 | 40 | 45 | 60 | 45 | 52 | 69 |
| 300% M (kgf/cm$^2$) | 101 | 60 | 120 | 110 | 108 | 150 | 410 |
| Strength (kgf/cm$^2$) | 411 | 215 | 458 | 502 | 490 | 520 | 652 |
| E (%) | 567 | 320 | 550 | 490 | 520 | 540 | 652 |
| 100% M at −10° C. (kgf/cm$^2$) | 71 | 102 | 80 | 76 | 73 | 98 | 728 |
| 300% M at −10° C. (kgf/cm$^2$) | 260 | 150 | 250 | 240 | 270 | 230 | — |
| 100% M at −30° C. (kgf/cm$^2$) | 162 | 350 | 180 | 190 | 146 | 186 | 403 |
| 300% M at −30° C. (kgf/cm$^2$) | 648 | — | 630 | 720 | 598 | 740 | — |

PCD: polycarbonatediol composition
M: modulus
E: elongation
used PCD (1) to (e): PCD prepared in Synthesis Examples from 1 to 6 and in Comparative Synthesis Example When the invention has been described in detail and with reference to specific examples thereof, it will be apparent to one skilled in the art that various changes and modifications can be made therein without departing from the spirit and scope thereof.

What is claimed is:

1. A polycarbonatediol composition obtained by reaction of a compound selected from the group consisting of compounds which require dehydrochlorination, alkylene carbonates, diaryl carbonates and dialkyl carbonates, with an aliphatic diol which comprises a mixture of (1) from 20 to 80 mol % of a polyether polyol having molecular weight of from 300 to 2,000 and 4 or less than 4 methylene groups, and (2) from 80 to 20 mol % of at least one polyvalent alcohol in which the number of carbon atoms in the polymer chain is not more than 20.

2. A polycarbonatediol composition as set forth in claim 1, wherein said polyether polyol is polytetramethylene glycol having molecular weight of not more than 1,000.

3. A polycarbonatediol composition as set forth in claim 1, wherein said polyvalent alcohol is 1,6-hexanediol.

4. A polycarbonatediol composition as set forth in claim 1, wherein said polyether polyol is polypropylene glycol having molecular weight of not more than 1,000.

5. A polycarbonatediol composition as set forth in claim 1, wherein said polyvalent alcohol is 1,4-butanediol.

6. A polycarbonatediol composition as set forth in claim 1, wherein said polyvalent alcohol is 3-methylpentanediol.

7. A polyurethane resin prepared by reaction of an organic diisocyanate compound with a polycarbonatediol composition obtained by reaction of a compound selected from the group consisting of compounds which require dehydrochlorination, alkylene carbonates, diaryl carbonates and dialkyl carbonates, with an aliphatic diol which comprises a mixture of (1) 20 to 80 mol % of a polyether polyol having molecular weight from 300 to 2,000 and 4 or less than 4 methylene groups, and (2) from 80 to 20 mol % of at least one polyvalent alcohol in which the number of carbon atoms in the polymer chain is not more than 20.

* * * * *